United States Patent
VanBlon et al.

(10) Patent No.: US 11,171,795 B2
(45) Date of Patent: Nov. 9, 2021

(54) SYSTEMS AND METHODS TO MERGE DATA STREAMS FROM DIFFERENT CONFERENCING PLATFORMS

(71) Applicant: Lenovo (Singapore) Pte. Ltd., Singapore (SG)

(72) Inventors: Russell Speight VanBlon, Raleigh, NC (US); Jonathan Jen-Wei Yu, Raleigh, NC (US); Axel Ramirez Flores, Cary, NC (US); Rodrigo Felix de Almeida, Raleigh, NC (US); Jonathan Co Lee, Cary, NC (US); James A. Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 52 days.

(21) Appl. No.: 16/370,207

(22) Filed: Mar. 29, 2019

(65) Prior Publication Data
US 2020/0313918 A1 Oct. 1, 2020

(51) Int. Cl.
*G06F 15/16* (2006.01)
*H04L 12/18* (2006.01)
*H04L 29/06* (2006.01)

(52) U.S. Cl.
CPC ...... *H04L 12/1827* (2013.01); *H04L 12/1822* (2013.01); *H04L 65/4038* (2013.01); *H04L 65/604* (2013.01)

(58) Field of Classification Search
CPC ............. H04L 12/1827; H04L 12/1822; H04L 65/4038; H04L 65/604
See application file for complete search history.

(56) References Cited

U.S. PATENT DOCUMENTS

| | | | |
|---|---|---|---|
| 5,195,086 A | 3/1993 | Baumgartner et al. | |
| 6,075,571 A * | 6/2000 | Kuthyar | H04N 7/15 348/14.07 |
| 6,138,144 A | 10/2000 | DeSimone et al. | |
| 6,584,077 B1 * | 6/2003 | Polomski | H04N 7/15 348/14.09 |
| 7,362,349 B2 * | 4/2008 | Nelson | H04N 7/147 348/14.08 |
| 7,412,392 B1 | 8/2008 | Satapathy | |
| 7,499,075 B2 * | 3/2009 | Miceli | H04N 7/147 348/14.08 |
| 7,558,221 B2 * | 7/2009 | Nelson | H04N 7/147 348/14.08 |

(Continued)

OTHER PUBLICATIONS

"About Pidgin", Pidgin, retrieved from https://pidgin.im/about/.

(Continued)

*Primary Examiner* — Rupal Dharia
*Assistant Examiner* — Dixon F Dabipi
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to receive a first data stream from a first conferencing service operated by a first conferencing service provider and to receive second data stream from a second conferencing service operated by a second conferencing service provider. The instructions are then executable to merge the first and second data streams.

20 Claims, 7 Drawing Sheets

(56) References Cited

U.S. PATENT DOCUMENTS

| | | | |
|---|---|---|---|
| 9,013,539 B1* | 4/2015 | Fulay | H04L 65/403 348/14.08 |
| 9,113,032 B1 | 8/2015 | Mey et al. | |
| 9,143,729 B2* | 9/2015 | Anand | H04N 7/152 |
| 9,420,108 B1* | 8/2016 | Bostick | H04L 65/403 |
| 9,781,385 B2* | 10/2017 | Ma | G06F 9/451 |
| 10,348,777 B2* | 7/2019 | Knotts | H04L 65/403 |
| 2003/0105820 A1 | 6/2003 | Haims et al. | |
| 2005/0264648 A1* | 12/2005 | Ivashin | H04N 7/152 348/14.09 |
| 2006/0164508 A1 | 7/2006 | Eshkoli et al. | |
| 2006/0184624 A1 | 8/2006 | Thukral | |
| 2007/0121530 A1 | 5/2007 | Vadlakonda et al. | |
| 2009/0089683 A1 | 4/2009 | Thapa | |
| 2009/0216835 A1 | 8/2009 | Jain et al. | |
| 2011/0271210 A1* | 11/2011 | Jones | H04L 67/36 715/753 |
| 2011/0279634 A1* | 11/2011 | Periyannan | H04N 5/265 348/14.09 |
| 2011/0279635 A1* | 11/2011 | Periyannan | H04N 7/152 348/14.09 |
| 2012/0062442 A1* | 3/2012 | Locker | G06F 3/1446 345/1.3 |
| 2012/0327175 A1* | 12/2012 | Couse | H04L 12/1818 348/14.08 |
| 2014/0192141 A1 | 7/2014 | Begeja et al. | |
| 2014/0267571 A1* | 9/2014 | Periyannan | H04L 65/80 348/14.08 |
| 2014/0267576 A1* | 9/2014 | Hiller | H04N 7/147 348/14.09 |
| 2014/0313278 A1* | 10/2014 | Periyannan | H04L 65/403 348/14.08 |
| 2015/0022625 A1 | 1/2015 | Thapa | |
| 2016/0099986 A1 | 4/2016 | Bentley et al. | |
| 2018/0101760 A1 | 4/2018 | Nelson et al. | |
| 2018/0176639 A1 | 6/2018 | Sprenger et al. | |
| 2018/0337968 A1 | 11/2018 | Faulkner | |
| 2019/0124128 A1 | 4/2019 | Bader-Natal et al. | |
| 2019/0166330 A1* | 5/2019 | Ma | H04L 65/403 |
| 2019/0215347 A1 | 7/2019 | Liau | |
| 2020/0411038 A1 | 12/2020 | Reynolds | |

OTHER PUBLICATIONS

"Natural Language Processing", Wikipedia, retrieved on Oct. 27, 2020 from https://en.wikipedia.org/wiki/Natural_language_processing.

"Sentiment analysis", Wikipedia, retrieved on Oct. 27, 2020, from https://en.wikipedia.org/wiki/Sentiment_analysis.

"Speech segmentation", Wikipedia, retrieved on Oct. 27, 2020 from https://en.wikipedia.org/wiki/Speech_segmentation.

"Text segmentation", Wikipedia, retrieved on Oct. 27, 2020 from https://en.wikipedia.org/wiki/Text_segmentation.

Christensen et al., "Graphical User Interfaces for Grouping Video Conference Participants", file history of related U.S. Appl. No. 17/119,225, filed Dec. 11, 2020.

Christensen et al., "Graphical User Interfaces for Monitoring Video Conferences", file history of related U.S. Appl. No. 17/119,060, filed Dec. 11, 2020.

Lee et al., "Facilitation of Two or More Video Conferences Concurrently", file history of related U.S. Appl. No. 16/792,209, filed Feb. 15, 2020.

* cited by examiner

SYSTEMS AND METHODS TO MERGE DATA STREAMS FROM DIFFERENT CONFERENCING PLATFORMS

FIELD

The present application relates to technically inventive, non-routine solutions that are necessarily rooted in computer technology and that produce concrete technical improvements.

BACKGROUND

As recognized herein, currently when two people wish to participate in audio video conferencing with each other, both people must use the same conferencing service and its associated software application. However, as also recognized here, doing so may be inconvenient, confusing, and annoying because a person that may wish to participate in the conference might not already be registered with the conferencing service that is to be used and so he or she must download the associated software application, learn how to use it, create a new account with the conferencing service, etc. Moreover, the person might have to do so instead of using another conferencing service that he or she might prefer and already be familiar with, further compounding the person's frustration. There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive a first data stream from a first conferencing service operated by a first conferencing service provider and to receive second data stream from a second conferencing service operated by a second conferencing service provider. The instructions are then executable to merge the first and second data streams.

The instructions may be executable to merge the first and second data streams at least in part by concurrently presenting the first and second data streams at the first device, and/or by providing the second data stream to the first conferencing service and concurrently providing the first data stream to the second conferencing service. The instructions may also be executable to provide the merged first and second data streams to a second device for concurrent presentation of the merged first and second data streams via the second device.

In some examples, the first and second data streams may respectively include at least audio data streams, while in other examples the first and second data streams may respectively include at least audio video (A/V) data streams.

Further, in some embodiments the instructions may be executable to decrypt the first data stream using a first encryption key associated with the first conferencing service provider and/or using a first application from the first conferencing service provider. In such an embodiment, the instructions may also be executable to decrypt the second data stream using a second encryption key and/or using a second application from the second conferencing service provider, with the second encryption key being different from the encryption key and being associated with the second conferencing service provider. The instructions may then be executable to merge the decrypted first and second data streams.

Moreover, the instructions may be executable to represent a first username to the second conferencing service that was identified via the first conferencing service and to represent a second username to the first conferencing service that was identified via the second conferencing service.

In some embodiments, the first device may be a stand-alone conferencing device, while in other embodiments the first device may be a server that provides the merged first and second data streams to a second device different from the server.

In another aspect, a method includes receiving respective first and second data streams from respective first and second Internet communication platforms and merging the first and second data streams.

In still another aspect, a computer readable storage medium that is not a transitory signal includes instructions executable by at least one processor to provide at least audio data from a first Internet communication application to a second Internet communication application and to concurrently provide at least audio data from the second Internet communication application to the first Internet communication application.

The details of present principles, both as to their structure and operation, can best be understood in reference to the accompanying drawings, in which like reference numerals refer to like parts, and in which:

DETAILED DESCRIPTION

Figure 1:
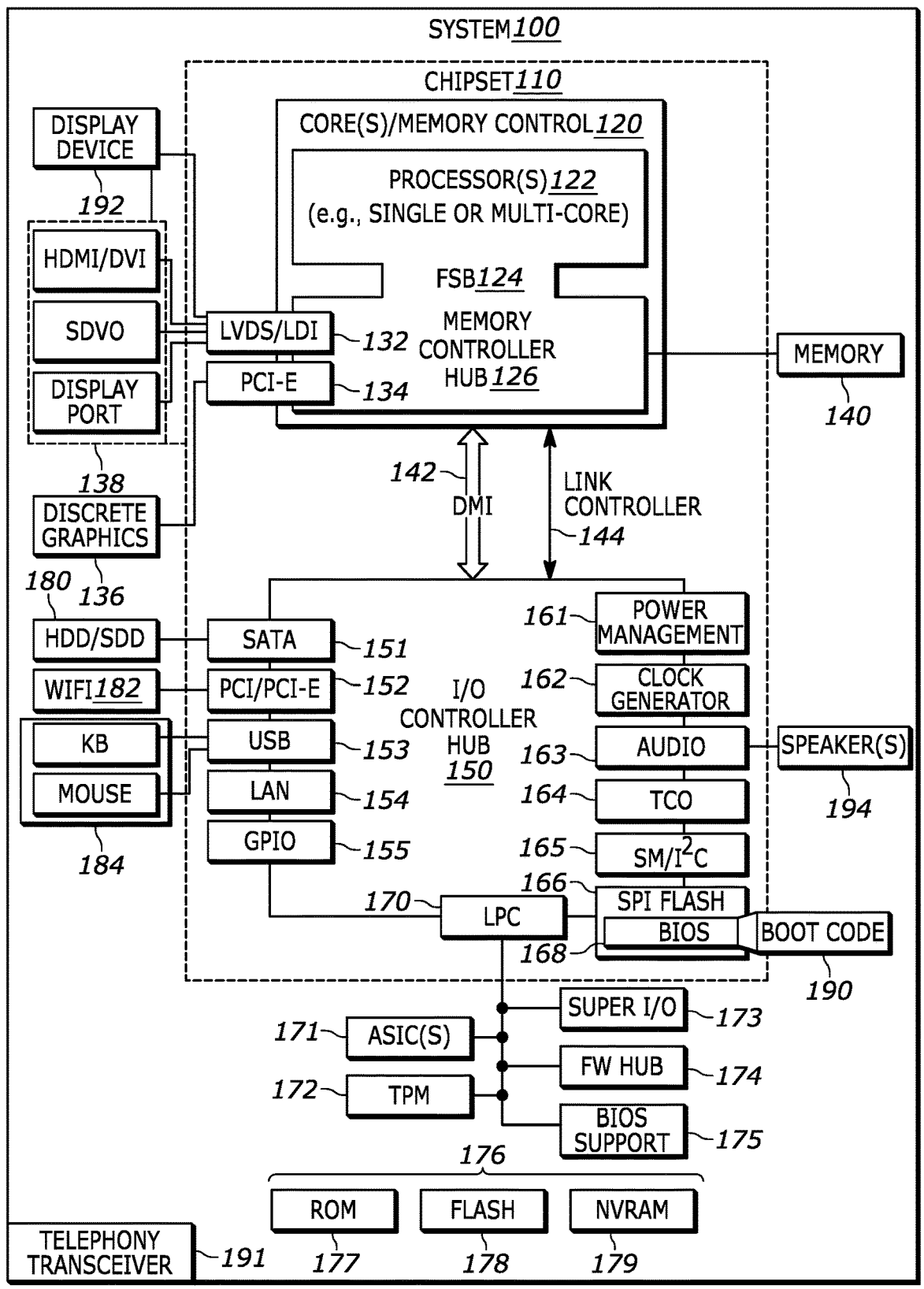
FIG. 1 is a block diagram of an example system in accordance with present principles.

The present application described systems and methods to combine audio video (AV) meetings or video conferences hosted by various conferencing services or platforms into single agnostic meeting by bridging people from one service/platform to quickly and easily talk to people from another service/platform without installing new software for the other service/platform. Furthermore, calendar events may be created or modified to include separate links for each respective platform/service so that users may choose the platform/service for which he or she might already have an associated application installed on his or her device. For example, if a user only has one platform's application installed on his or her smartphone, and another platform's application installed on his or her laptop computer, that person could open the appropriate link depending on which of those devices they are using, and hence which platform is more readily available.

The email/calendar client may also be enabled to parse links and only show links applicable to that particular device when presenting links via that particular device, depending on which platform's software application was available on that device so the user does not have to select the right one himself or herself. For example, a device with one platform's application would only show a link to conference using that platform, possibly with advanced options to show the link for another platform that might be available for conferencing but for which an associated application is not yet installed on that device.

Also, in accordance with present principles, a conferencing hub device may process multiple links provided in the calendar event, each associated with a different conferencing platform. The hub device may then manage both meeting channels simultaneously and merge those meeting channels together so that audio may be heard between channels, video may be viewed between channels, and instant message text chatting may be shared between channels. The hub device may have software applications for each conferencing platform that is to be used installed on it so that it may manage and merge the various channels using the respective applications.

Additionally, in some embodiments the hub device may translate users from one platform/service to another. For example, on a hub connection between two different conferencing platforms with one conferee using one platform and another conferee using the other platform, a dynamic username for a conferee using the first platform may be created on-the-fly to allow the other conferee to "see" a virtual user via the other conferee's platform, and vice versa. This may be implemented using a collection of default "users" for a given conferencing service that are represented by generic names, and then assigning those generic names in real time to various conferees during the conference depending on which users need to be "hot swapped" between platforms during the meeting. That username may then be rotated out for other meetings/users so that no change would be needed to host servers for the first platform.

Also, for example, a conferee using a first platform may be assigned a name based on their username for a different platform, and then that name may be shown for a conference hosted by the first platform. Thus, if one of the platforms were upgraded to allow for such communication, no default user names might be used as described in the paragraph immediately above. Rather, in this example the hub device may create these "converted users" and their associated names on-the-fly to allow for cross-platform video conferencing.

Thus, the present application provides systems and methods to automatically connect users to an online meeting, call, video, or chat without the users all having to use the same unified communication (UC) service. By providing a UC translator that can identify the service each user is using, the present application allows for someone using one UC service to conference or speak with a user using another UC service. In some embodiments, to accomplish this, the users may aggregate login information for all of their UC accounts in a single storage location, log in via a hub device's software that has access to that information, and then depending on the type of software the recipients and other meeting participants have on their respective devices the hub device software can automatically choose the best way to connect all conferees if they share a common application or "convert" one UC's feed into another feed to be provided to the other UC.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, a telephony transceiver 191 may also be included in the system 100. The telephony transceiver 196 may be a wired or wireless telephony transceiver, such as a wireless cellular telephone transceiver for wireless cellular communication over a cellular telephone network as well as other telephone networks to call in to a conference as disclosed herein so that audio from a given user calling in to a conference over a telephone network may be merged with audio from other conferees that might be using an Internet connection.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
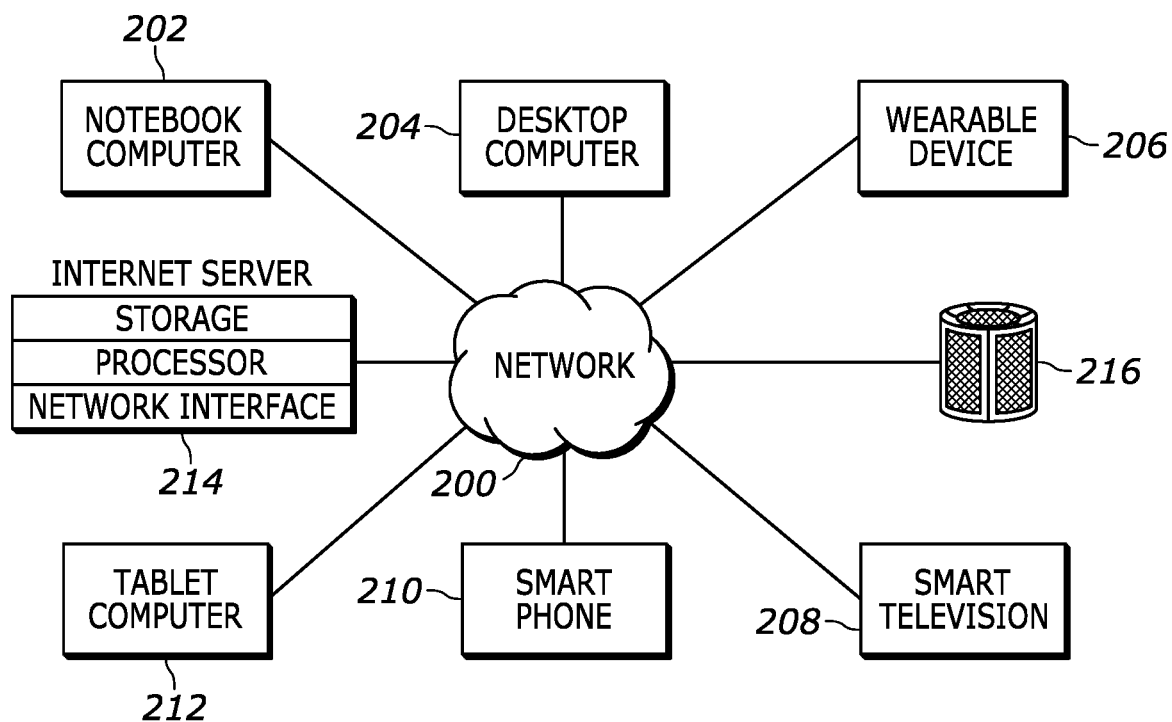
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a conferencing hub device 216, and a server 214 such as an Internet server that may provide cloud storage accessible to the devices 202-212, 216. The server 214 and/or hub device 216 may also execute and manage software to merge data streams in accordance with present principles. It is to be understood that the devices 202-216 are configured to communicate with each other over the network 200 to undertake present principles and, in some embodiments, some or all of the devices 202-216 may be, for example, located within a same conference room as each other.

Describing the conferencing hub device 216 in more detail, it may be, for example, an IP conference phone, a Lenovo ThinkSmart Hub 500, and/or a Lenovo ThinkSmart Hub 700 that communicates with the server 214 for merging data streams in accordance with present principles. Furthermore, the conferencing hub device 216 may include, for example, one or more processors, one or more of the sensors such as infrared proximity sensors and/or cameras for providing video of call participants, one or more touch-enabled displays for presenting merged video data streams, one or more storage areas, a keypad for conferencing via telephone dialing, a microphone for receiving audio of call participants, a speaker for providing audio from merged audio data streams, etc.

Figure 3:
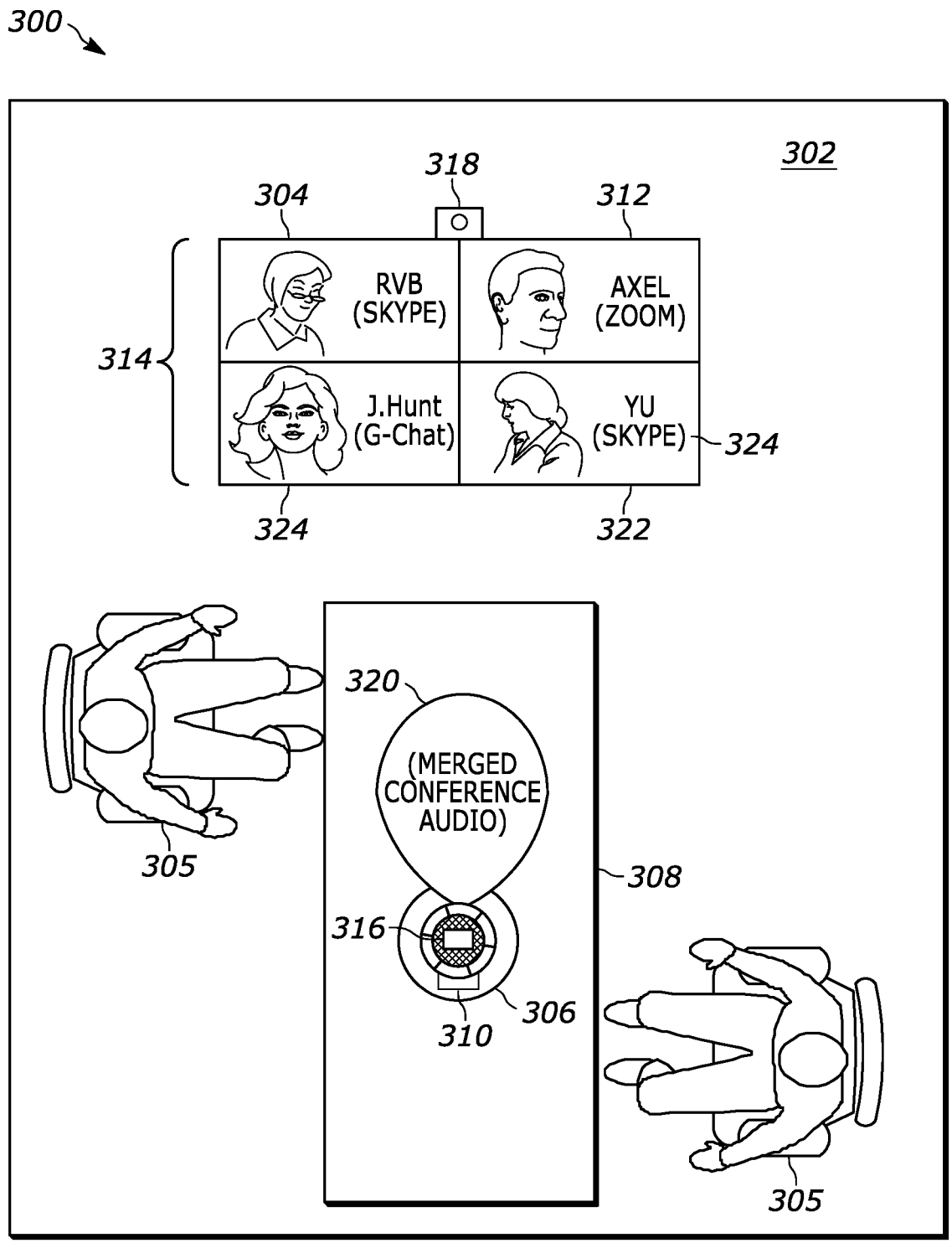
FIG. 3 is an example illustration of a conference room environment in accordance with present principles.

Now in reference to FIG. 3, it shows an example illustration 300 of a conference room 302. Disposed within the conference room 302 is a display 304 presenting a visual merger 312 of respective video data streams that show remotely-located conferees 314 (e.g., not physically present within the room 302) that might be using different audio/video (AV) conferencing services in accordance with present principles so that in-person conferees 305 (e.g., physically present within the room 302) can view the video streams of the remotely-located conferees 314 in real time. The display 304 itself may be mounted on a wall within the room 302, and it may also be in communication with and controllable by a conferencing hub device 306 located on a conference table 308 within the room 302 and/or by a server such as the server 214 described above. However, also note that the display 304 may be located on the hub device 306 itself in some embodiments.

Further describing the hub device 306, it may be similar to the hub device 216 described above. For example, the hub device 306 may include one or more speakers 310 that provide a merger of respective audio data streams of words and utterances spoken by the remotely-located conferees 314 so that the in-person conferees 305 can hear the audio streams 320 of the remotely-located conferees 314 in real time as the remotely-located conferees 314 speak. However, note that in other examples the speakers 310 may be located at other areas of the room 302 rather than disposed on the device 306, but that the speakers 310 may nonetheless be in communication with and controllable by the device 306 and/or the server.

As may also be appreciated from FIG. 3, the hub device 306 may also include a microphone 316, though the microphone 316 may also be disposed elsewhere within the room but still be in communication with and controllable by the hub device 306 and/or by the server. In either case, the microphone 316 may collect input of spoken words and utterances from the conferees 305 so that the hub device 306 and/or server can provide the input as an audio data stream to the one or more remotely-located conferees 314 via their own respective devices.

A camera 318 may also be disposed within the room 302 to generate a video data stream of the conferees 305, with the camera 318 being in communication with and controllable by the hub device 306 and/or by the server to provide the video data stream of the conferees 305 to the one or more remotely-located conferees 314 via the conferees' 314 own respective devices.

Still describing FIG. 3, also note that in the illustration shown, a separate real time video data stream of each of the remotely-located conferees 314 is concurrently presented, each in one of the four quadrants shown and with at least two of the conferees 314 using different conferencing services/platforms. This embodiment is thus one example of merging data streams in accordance with present principles.

Also note that each video data stream may have overlaid on it both a username 322 of the respective conferee 314 shown in that respective quadrant, and a text identifier 324 indicating a respective conferencing service, platform, and/or application being used by the respective conferee 314 to participate in the conferencing depicted in FIG. 3.

Figure 4:
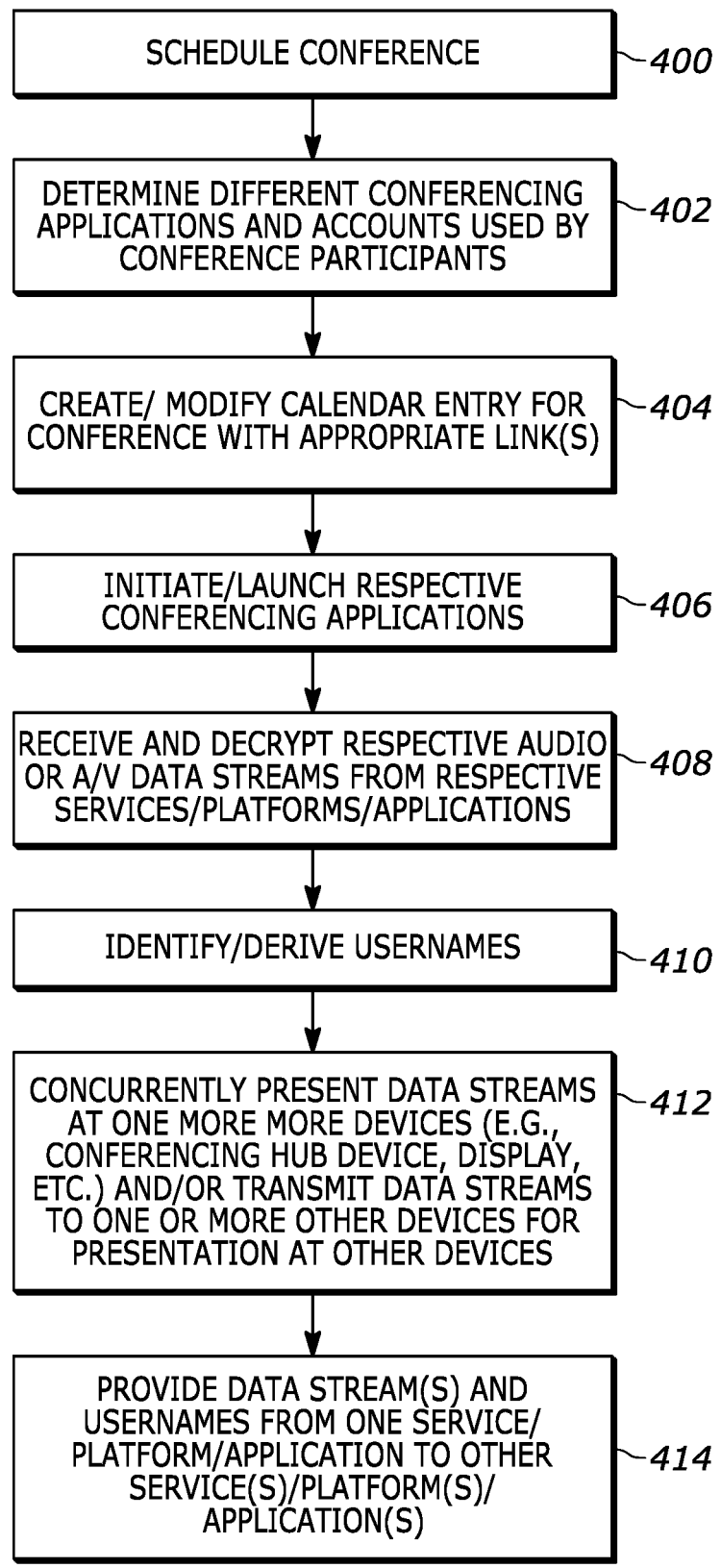
FIG. 4 is a flow chart of an example algorithm to be executed by a hub device and/or server in accordance with present principles.

Referring now to FIG. 4, it shows example logic that may be executed by a device such as the system 100, the server 214, and/or a conferencing hub device in accordance with present principles for merging data streams in accordance with present principles. Beginning at block 400, the device may schedule an audio video (AV) teleconference for certain participants based on input from one or more people (e.g., a conference organizer) specifying the participants, conference time, conference location, etc. The logic may then move to block 402 where the device may determine if different conferencing applications and associated accounts will be used by the respective conference participants. Different applications and accounts may be used by the respective participants if, for example, they each use a different conference platform (e.g., Skype, Zoom, etc.) and have an associated application for that platform installed on their respective device. Thus, it is to be understood that the device undertaking the logic of FIG. 4 may have electronic access to the respective conferee devices to identify the respective conferencing applications installed on them or, at least, have access to a database indicating the respective conferencing applications/platforms used by the respective conferees.

The logic may then move to block 404 where the device may create or modify a calendar entry and/or a conference information page for the scheduled conference, with the entry/page being emailed to or otherwise accessible to each conferee via their own respective device. The calendar entry/page may be created or modified at block 404 to include respective links for accessing the scheduled conference via each of the respective applications determined at block 302 so that each person may participate in the conference by selecting the appropriate link for the respective conferencing platform/service he or she wishes to use.

After block 404 the logic may move to block 406 where the device undertaking the logic of FIG. 4 may initiate and/or launch respective conference applications locally at the device, with each application that is stored and launched at the device being a copy of one of the applications also identified at block 402. From block 406 the logic may then move to block 408 where the device may initiate or coordinate the conference, and then receive and decrypt respective audio or AV data streams from each respective conferee (e.g., remotely-located conferee) via the same application also used by the respective conferee's own device to transmit the stream to the device executing the logic of FIG. 4.

For example, the platform/service used by a respective conferee may route an encrypted data stream to the device undertaking the logic of FIG. 4 that was generated by a copy of its application as executed at a remotely-located conferee's own device. The device undertaking the logic of FIG. 4 may then decrypt each respective data stream using an encryption key for the decryption, e.g., a key stored locally at the device and/or a key provided by the respective platform/service. The device may do so outside of execution of the respective conferencing applications themselves as lunched at block 406, and/or the device may do so by using the respective conferencing applications themselves for those applications to execute the decryption.

Still in reference to FIG. 4, from block 408 the logic may move to block 410. At block 410 the device may identify usernames used by each respective conferee via the respective conferencing service/platform being used by that respective conferee. For example, during a registration process for the respective service/platform, the respective conferee may have created a unique username for use with that service/platform, and that service/platform may then transmit information indicating the username with each audio or AV data stream provided at a later time.

Additionally, or alternatively, the device may derive or otherwise create new or unique usernames based on the usernames used by each respective conferee via the respective conferencing service/platform being used by that respective conferee. For example, if the username used by one of the respective conferees via that conferee's preferred conferencing service/platform includes both a "handle" and a domain name preceded by an "@" symbol (e.g., russell@conferencingservice.com), the "handle" may be selected ("russell" in this example) while the domain name ("conferencingservice.com in this example) may not. Then the selected "handle" may be represented to the other conferees in accordance with present principles (e.g., as described in reference to element 322 above) without also representing the domain name that would otherwise form a part of the username for the conferee via his or her respective platform/service.

Still further, it is to be understood that generic, predefined placeholder usernames may also be identified and used at block 410. E.g., "conference service 1, user 1" and "conference service 2, user 1". These placeholder usernames may be used, for example, based on configuration of a setting by a system administrator or where a username cannot be derived/created for whatever reason as set forth in the paragraph immediately above.

After block 410 the logic may proceed to block 412. At block 412 the device undertaking the logic of FIG. 4 may concurrently present merged data streams at the device itself and/or transmit merged data streams (e.g., as a single data stream) to one or more other devices in communication with it for presentation at those other devices (e.g., the display 304 in the example above, and/or a hub device if the logic is being executed by a server in communication with the hub device).

For instance, the device undertaking the logic of FIG. 4 may be a hub device and it may receive respective audio data streams from each conferee's own device and concurrently present all of the audio data streams as one audio output on a speaker disposed on the hub device. At the same time, the hub device may also receive respective video data streams from each conferee's own device and concurrently present all of the video data streams as one visual output on a common display in communication with the hub device (e.g., in a conference room being used by at least one of the conferees).

From block 412 the device may then proceed to block 414. At block 414 the device may provide respective audio and video data streams received from one conferee to the other respective conferees (e.g., that are remotely-located from the conference room). This may include providing audio or AV data streams of in-person conferees located within the conference room to the respective devices of remotely-located conferees, as well as providing the data streams of remotely-located conferees to the devices of each other.

For example, the device may do so at block 412 by taking a decrypted data stream from one remotely-located conferee device that is using one platform/service and then providing it to another remotely-located conferee device using another platform/service after re-encrypting the stream for the other platform/service using an encryption key for that other conferee's platform/service.

Figure 5:
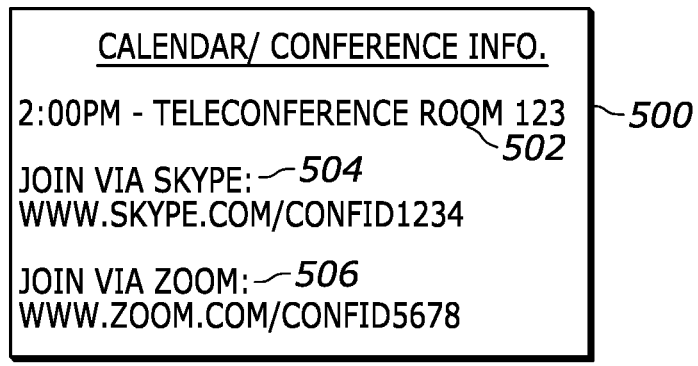
FIGS. 5-8 show various graphical user interfaces (GUI) presentable on a conferee's personal device or a commonly-shared display in accordance with present principles.

Continuing the detailed description in reference to FIG. 5, it shows an example graphical user interface (GUI) 500 presentable on the display of a hub device and/or a conferee's own personal device (e.g., smartphone or laptop) in accordance with present principles. The GUI 500 may be presented as part of a calendar entry for the respective conferee's own personal electronic calendar, as part of a calendar entry for a room calendar associated with the room in which some or all of a conference's participants will meet, as part of an email invitation to conference that has been sent to the conferees, as part of an informational screen presented on the display of the hub device itself, etc.

The GUI 500 may include information 502 pertaining to the conference, such as a time that the conference has been scheduled to occur and an indication of a room number of a building at which the conference may be attended in person. The GUI 500 may also include respective links 504, 506 associated with different conferencing services/platforms that may be selected to initiate participation in the conference itself. For example, the links may be been determined at step 404 described above and then provided to each conferee via his or her own personal device, and/or provided on the hub device itself. A given conferee may then selected one of the links as presented on the GUI 500 (e.g., via touch input directed to a display on which the GUI 500 is presented). This in turn may cause the conferee's own personal device and/or the device presenting the GUI 500 to launch an application for the platform/service associated with the selected link to thus participate in the conference using the link.

Figure 6:
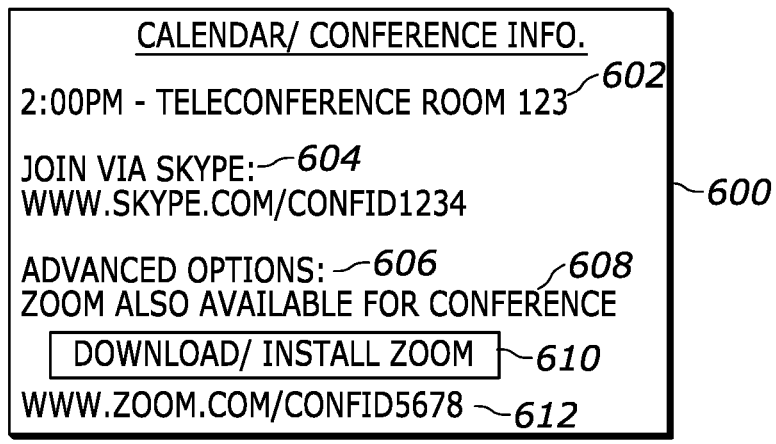

FIG. 6 shows another example GUI 600 that may be presented on the display of a conferee's personal device. The GUI 600 in similar to the GUI 500 in that it may be presented as part of a calendar entry, email invitation, informational screen, etc. and in that it may include at least one link 604 determined, e.g., at block 404 described above. It may also include information 602 to pertaining to the conference.

Differentiating FIG. 6 from FIG. 5, in this example the GUI 600 only indicates one or more links 604 for respective conferencing platforms/services having associated applications that have already been downloaded and installed on the respective device presenting the GUI 600. This may contribute to a more streamlined GUI for a given conferee so that the conferee does not have to identify which link might be appropriate for use on his or her personal device, as might be the case should the GUI 500 be presented. Instead, via the GUI 600 a conferee may be presented only with a link to conference using a conferencing application already installed at that conferee's personal device.

However, in some embodiments the GUI 600 may still include advanced options 606. The advanced options 606 may indicate 608 that another conferencing service/platform might also be available for use to participate in the conference, even if the respective conferee is not already registered with the other service/platform and/or even if he or she does not have the other service/platform's application installed at his or her personal device. The indication 608 may be accompanied by a selector 610 that is selectable to command the conferee's personal device to automatically download and install the application for the other service/platform. The indication 608 may be further accompanied by a link 612 that is selectable to initiate the application once installed for participation in the conference.

Figure 7:
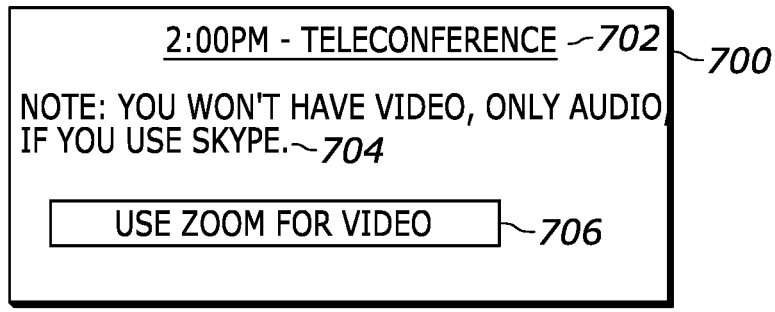

FIG. 7 shows yet another GUI 700 that may be presented on one of the devices disclosed herein, e.g., a conferee's personal device. The GUI 700 may include an indication 702 of a 2:00 p.m. conference as well as an indication 704 that if a given conferencing platform/service is used, the conferee viewing the GUI 700 may be able to observe a merged audio data stream for the conference but not an associated merged video data stream for the conference. This situation may arise due to a variety of issues, e.g., use of outdated encryption keys preventing decryption of a video data stream, limited Internet bandwidth at a location at which the conferee is disposed, connectivity issues with the platform/service itself, etc. Regardless, the indication 704 may also indicate that another conferencing service/platform may be used for observing both audio and video data streams, and thus the GUI 700 may also include a selector 706 that is selectable to initiate use the other service/platform. For example, the selector 706 may be selectable to automatically launch a copy of an application provided by the other service/platform for conferencing, and/or to first download and install that application before launching it.

Figure 8:
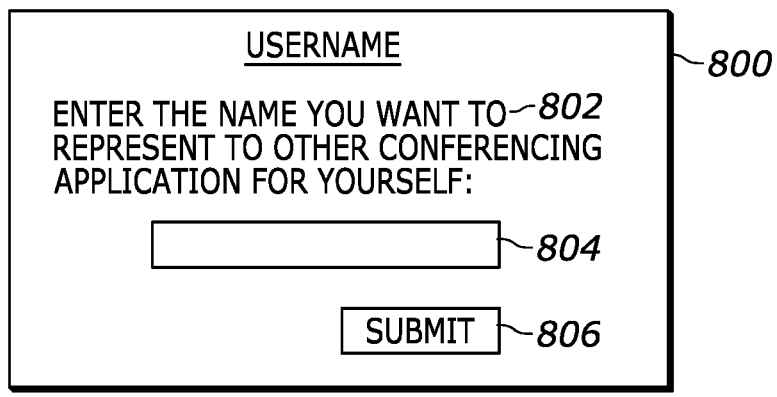

FIG. 8 shows still another example GUI 800 that may be presented on one of the devices disclosed herein, e.g., a conferee's personal device and/or a common display controlled by a conferencing hub device. The GUI 800 may be used for a given conferee to establish a preferred username that he or she wishes to represent to other conferees during a given conference that is to occur. Thus, instructions 802 instruct a conferee to provide input to text entry box 804 to then establish text entered into the box 804 as the username responsive to selection of the submit selector 806.

Figure 9:
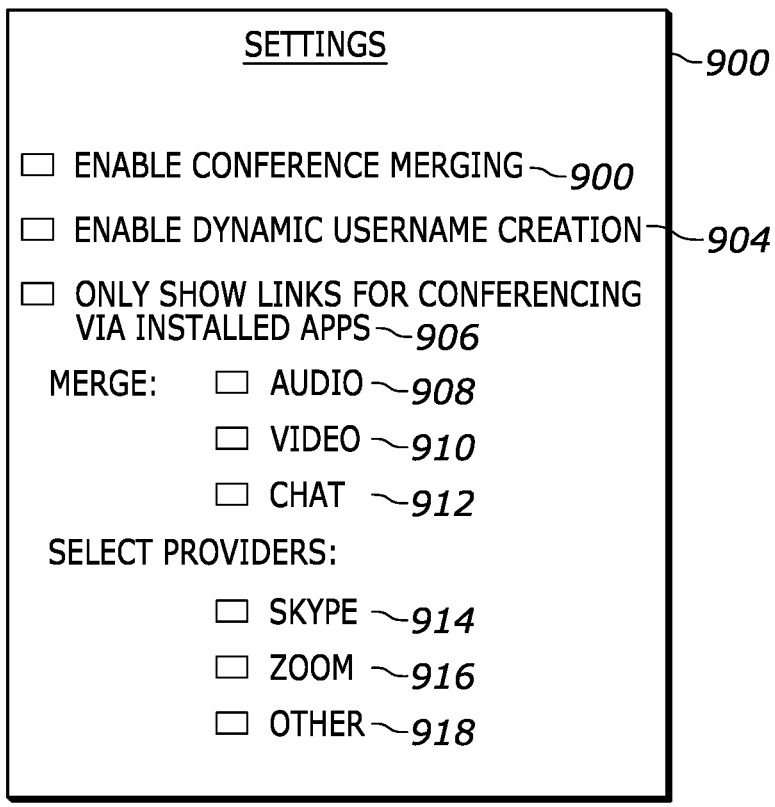
FIG. 9 shows an example GUI for configuring settings of a device undertaking present principles.

Now in reference to FIG. 9, it too shows an example GUI 900 that may be presented on one of the devices disclosed herein, e.g., a conferee's personal device and/or a common display controlled by a conferencing hub device. The GUI 900 lists various settings that may be enabled or configured for conferencing, and each setting may be selected by selecting the respective check box shown adjacent to the respective setting.

Thus, the GUI 900 may include a first setting 902 that is selectable to enable conference merging in accordance with present principles. For example, the setting 902 may be selectable to enable a device such as a conferencing hub device or server to undertake the logic set forth above with respect to FIG. 4.

The GUI 900 may also include a second setting 904 to enable the conferencing hub device and/or server to identify and/or derive usernames as described above and to represent those usernames to other conferees in accordance with present principles. For example, the setting 904 may be selectable to enable the conferencing hub device or server to specifically perform step 410 described above.

The GUI 900 may further include a third setting 906 to enable the conferencing hub device and/or server to only present, to individual conferees via their own respective devices or calendars, links to participate in the conference via conferencing applications already installed on that respective conferee's personal device. For example, the setting 906 may be selectable to enable the conferencing hub device or service to specifically present the GUI 600 to a given conferee.

The GUI 900 may also include settings 908-912 for selecting various types of data streams to merge for presentation to conferees in accordance with present principles. For example, setting 908 may be selectable to merge audio data streams, setting 910 may be selectable to merge video data streams, and setting 912 may be selectable to merge text message/text chatting data streams.

Additionally, the GUI 900 may include settings 914-918 for selecting various conference platforms/providers to be used for merged conferencing in accordance with present principled. For example, a setting 914 may be selectable to use a first conferencing service, a setting 916 may be selectable to use a second conferencing service, a setting 918 may be selectable to use a third conferencing service.

Moving on from FIG. 9, it is to be understood in accordance with present principles that some conferencing may occur with some conferees using an Internet connection to provide their respective data streams to others and with other conferees using a telephone number to call in to the conference over a telephone network. Thus, the audio from a conferee calling in over a telephone network may also be merged with audio from conferees using an Internet connection in accordance with present principles.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   present a graphical user interface (GUI) on a display, the GUI comprising text and a selector, the text indicating (1) that a first conferencing service operated by a first conferencing service provider is usable for conferencing with an audio data stream and without a video data stream, and (2) that a second conferencing service operated by a second conferencing service provider is usable for the conferencing with an audio data stream and a video data stream, the second conferencing service being different from the first conferencing service, the first conferencing service provider being different from the second conferencing service provider, the selector being selectable by a user to provide a command to use the second conferencing service for the conferencing;
   based on selection of the selector, receive one or more first data streams from the second conferencing service operated by the second conferencing service provider, the one or more first data streams comprising audio data and video data related to the conferencing;
   receive one or more second data streams from a third conferencing service operated by a third conferencing service provider; and
   merge the one or more first data streams and the one or more second data streams.

2. The first device of claim 1, wherein the instructions are executable by the at least one processor to:
   merge the one or more first data streams and one or more second data streams at least in part by concurrently presenting, at the first device, the first and second data streams.

3. The first device of claim 1, wherein the instructions are executable by the at least one processor to:
   provide the merged one or more first data streams and one or more second data streams to a second device for concurrent presentation of the merged one or more first data streams and one or more second data streams via the second device.

4. The first device of claim 1, wherein the instructions are executable by the at least one processor to:
   merge the one or more first data streams and one or more second data streams at least in part by providing the one or more second data stream to the second conferencing service and concurrently providing the first data stream to the third conferencing service.

5. The first device of claim 1, wherein the first device is a server, and wherein the server provides the merged one or more first data streams and one or more second data streams to a second device different from the server.

6. A method, comprising:
   presenting a graphical user interface (GUI) on a display, the GUI comprising text and a selector, the text indicating (1) that a first Internet communication platform is usable for electronic conferencing with audio and without video, and (2) that a second Internet communication platform is usable for the electronic conferencing with audio and video, the second Internet communication platform being different from the first Internet communication platform, the selector being selectable by a user to provide a command to use the second Internet communication platform for the electronic conferencing;
   receiving one or more first data streams and one or more second data streams respectively from the second Internet communication platform and a third Internet communication platform, the one or more first data streams comprising audio and video related to the electronic conferencing; and
   based on selection of the selector, merging the one or more first data streams and the one or more second data streams.

7. The method of claim 6, comprising:
   merging the one or more first data streams and the one or more second data streams at least in part by concurrently presenting the one or more first data streams and the one or more second data streams via at least one electronic device.

8. The method of claim 6, comprising:
deriving a first name from information from the second Internet communication platform and representing the first name to the third Internet communication platform; and
deriving a second name from information from the third Internet communication platform and representing the second name to the second Internet communication platform.

9. A computer readable storage medium (CRSM) that is not a transitory signal, the computer readable storage medium comprising instructions executable by at least one processor to:
present a graphical user interface (GUI) on a display, the GUI comprising text and a selector, the text indicating (1) that a first Internet communication platform is usable for conferencing with audio and without video, and (2) that a second Internet communication platform is usable for the conferencing with audio and video, the second Internet communication platform being different from the first Internet communication platform, the selector being selectable by a user to provide a command to use the second Internet communication platform for the conferencing;
provide, as part of the conferencing, audio video (A/V) data from the second Internet communication platform to a third Internet communication platform; and
concurrently provide, as part of the conferencing, A/V data from the third Internet communication platform to the second Internet communication platform.

10. The first device of claim 1, wherein the selector is selectable by the user to launch a copy of an application provided by the second conferencing service provider for the conferencing.

11. The first device of claim 1, wherein the selector is selectable by the user to download and install a copy of an application provided by the second conferencing service provider for the conferencing.

12. The first device of claim 1, wherein the selector is selectable by the user to download, install, and then launch a copy of an application provided by the second conferencing service provider for the conferencing.

13. The first device of claim 1, wherein the third conferencing service is different from the second conferencing service, and wherein the third conferencing service is different from the first conferencing service.

14. The first device of claim 1, wherein the GUI is a first GUI, and wherein the instructions are executable to:
present a second GUI on the display, the second GUI being different from the first GUI, the second GUI comprising a setting that is selectable to enable merging of various data streams from different conferencing services being used for a respective conference, the setting being selectable a single time to enable plural instances of merging in the future for different conferences; and
based on the setting being enabled, merge the one or more first data streams and the one or more second data streams.

15. The method of claim 6, wherein the selector is selectable by the user to launch a copy of an application provided by the second Internet communication platform for the electronic conferencing.

16. The method of claim 6, wherein the third Internet communication platform is different from the second Internet communication platform, and wherein the third Internet communication platform is different from the first Internet communication platform.

17. The method of claim 6, wherein the GUI is a first GUI, and wherein the method comprises:
presenting a second GUI on the display, the second GUI comprising a setting that is selectable to enable merging of various data streams from different Internet communication platforms being used for a respective electronic conference, the setting being selectable a single time to enable plural instances of merging in the future for different electronic conferences;
based on the setting being enabled, merging the one or more first data streams and the one or more second data streams.

18. The CRSM of claim 9, wherein the GUI is a first GUI, and wherein the instructions are executable to:
present a second GUI on the display, the second GUI comprising a setting that is selectable to enable merging of various data streams from different Internet communication platforms being used for a respective conference, the setting being selectable a single time to enable plural instances of merging in the future for different conferences.

19. The CRSM of claim 9, wherein the third Internet communication platform is different from the second Internet communication platform, and wherein the third Internet communication platform is different from the first Internet communication platform.

20. The first device of claim 14, wherein the setting is a first setting, and wherein the second GUI comprises a second setting different from the first setting, the second setting being selectable to enable merging of text message chatting for a respective conference.

* * * * *